US 9,967,782 B2

(12) United States Patent
Hori

(10) Patent No.: US 9,967,782 B2
(45) Date of Patent: May 8, 2018

(54) NETWORK NODE AND SIGNALING PROCESSING METHOD

(71) Applicant: Panasonic Intellectual Property Corporation of America, Torrance, CA (US)

(72) Inventor: Takako Hori, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days. days.

(21) Appl. No.: 15/285,716

(22) Filed: Oct. 5, 2016

(65) Prior Publication Data

US 2017/0026878 A1    Jan. 26, 2017

Related U.S. Application Data

(63) Continuation of application No. PCT/JP2015/002134, filed on Apr. 20, 2015.
(Continued)

(30) Foreign Application Priority Data

Jul. 4, 2014    (JP) ................................ 2014-138668

(51) Int. Cl.
*H04W 36/00*    (2009.01)
*H04W 36/14*    (2009.01)
*H04L 29/06*    (2006.01)

(52) U.S. Cl.
CPC ....... *H04W 36/0022* (2013.01); *H04L 65/103* (2013.01); *H04L 65/1006* (2013.01);
(Continued)

(58) Field of Classification Search
CPC ......... H04W 36/0022; H04W 36/0005; H04W 36/14; H04W 40/02; H04W 88/181;
(Continued)

(56) References Cited

U.S. PATENT DOCUMENTS

2009/0156169 A1* 6/2009 Hokamura ............ H04M 3/533
                                                              455/412.1
2009/0209255 A1* 8/2009 Lassers ................ H04W 88/181
                                                              455/436

(Continued)

FOREIGN PATENT DOCUMENTS

WO    2012/017951    2/2012
WO    2013/080471    6/2013

OTHER PUBLICATIONS

International Search Report of PCT application No. PCT/JP2015/002134 dated Jul. 7, 2015.
(Continued)

*Primary Examiner* — Timothy Pham
(74) *Attorney, Agent, or Firm* — Seed IP Law Group LLP

(57) ABSTRACT

A network node having ATCF for use in eSRVCC includes an SDP analyzing unit that acquires information regarding a codec contained in a SDP offer/SDP answer, a data storage unit that holds at least one of information regarding a codec supported by ATGW or a neighboring MGW, information regarding transcoding supported by the ATGW or the neighboring MGW, and information regarding a codec supported by a neighboring CS network, and a determination unit that determines whether transmission of the SDP offer for codec re-negotiation from the ATCF to a communication terminal is allowed using the information regarding a codec acquired in the SDP analyzing unit and information retrieved from the data storage unit.

8 Claims, 13 Drawing Sheets

Related U.S. Application Data

(60) Provisional application No. 61/992,222, filed on May 13, 2014.

(52) U.S. Cl.
CPC ...... *H04L 65/1016* (2013.01); *H04L 65/1023* (2013.01); *H04L 65/1069* (2013.01); *H04W 36/14* (2013.01)

(58) Field of Classification Search
CPC .... H04W 8/22; H04L 65/608; H04L 65/1023; H04L 65/1006; H04L 65/1016; H04L 65/103; H04L 65/1069; H04M 3/00
USPC ........................................................ 455/436
See application file for complete search history.

(56) References Cited

U.S. PATENT DOCUMENTS

| | | | |
|---|---|---|---|
| 2009/0290573 A1* | 11/2009 | Belling | H04N 7/148 370/352 |
| 2013/0102315 A1* | 4/2013 | Koshimizu | H04W 36/0022 455/436 |
| 2013/0208659 A1 | 8/2013 | Nishida | |
| 2013/0246052 A1* | 9/2013 | Tanaka | G10L 19/00 704/201 |
| 2013/0272194 A1* | 10/2013 | Keller | H04W 36/0022 370/328 |
| 2014/0342739 A1 | 11/2014 | Hod | |

OTHER PUBLICATIONS

3GPP TS23.216 v12.1.0, "Single Radio Voice Call Continuity; Stage2", Jun. 2014.
3GPP TS23.228 v12.0.0, "IP Multimedia Subsystem; Stage2", Mar. 2013.
3GPP TS23.237 v12.6.0, "IP Multimedia Subsystem Service Continuity; Stage2", Mar. 2014.
3GPP TR22.813 v10.0.0, "Study of Use Cases and Requirements for Enhanced Voice Codecs for the Evolved Packet System", Mar. 2010.
3GPP TS 23.334 V12.3.0, "3$^{rd}$ Generation Partnership Project; Technical Specification Group Core Network and Terminals; IP Multimedia Subsystem (IMS) Application Level Gateway (IMS-ALG)—IMS Access Gateway (IMS-AGW) interface: Procedure descriptions (Release 12)," Mar. 2014, 69 pages.
Extended European Search Report, dated Mar. 28, 2017, for corresponding European Application No. 15792804.5-1853/3145165, 8 pages.

\* cited by examiner

FIG. 6

| SDP OFFER |
|---|
| m=audio 49152 RTP/AVP 97 98 99 100<br>a=tcap:1 RTP/AVPF<br>a=pcfg:1 t=1<br>a=rtpmap:97 AMR-WB/16000/1<br>a=fmtp:97 mode-change-capability=2; max-red=220<br>a=rtpmap:98 AMR-WB/16000/1<br>a=fmtp:98 mode-change-capability=2; max-red=220; octet-align=1<br>a=rtpmap:99 AMR/8000/1<br>a=fmtp:99 mode-change-capability=2; max-red=220<br>a=rtpmap:100 AMR/8000/1<br>a=fmtp:100 mode-change-capability=2; max-red=220; octet-align=1<br>a=ptime:20<br>a=maxptime:240 |
| SDP ANSWER |
| m=audio 49152 RTP/AVPF 97<br>a=acfg:1 t=1<br>a=rtpmap:97 AMR/8000/1<br>a=fmtp:97 mode-change-capability=2; max-red=200<br>a=ptime:40<br>a=maxptime:240 |

NETWORK NODE AND SIGNALING PROCESSING METHOD

BACKGROUND

1. Technical Field

The present disclosure relates to a network node for use in a mobile communication method and a signaling processing method performed in the network node.

2. Description of the Related Art

A voice call in a third generation partnership project (3GPP) mobile communication method has been provided using a 3GPP circuit switched (CS) network. In recent years, a Voice over Long Term Evolution (VoLTE) service, which is a voice call service using a 3GPP packet switched (PS) network, has been started.

However, areas where a VoLTE service is provided are limited. Accordingly, if a user moves outside the VoLTE coverage area during a voice call made over VoLTE (hereinafter referred to as a "VoLTE voice call"), the voice call needs to be moved to the legacy circuit switched domain. One of the technologies for allowing the transition is Single Radio Voice Call Continuity (SRVCC) described in 3GPP TS23.216 v12.6.0 "Single Radio Voice Call Continuity (SRVCC)". An SRVCC handover procedure is described below with reference to FIGS. 1 and 2.

FIG. 1 illustrates part of the mobile communication network configuration of 3GPP. A mobile communication network illustrated in FIG. 1 includes evolved Universal Terrestrial Radio Access Network (e-UTRAN), a base station of e-UTRAN (e-nodeB), a PS network, a CS network, a base station subsystem of the CS network, and IP Multimedia Subsystem (IMS) described in 3GPP TS23.228 v12.0.0 "IP Multimedia Subsystem (IMS); Stage2" and 3GPP TS23.237 v12.6.0 "IP Multimedia Subsystem (IMS) Service Continuity".

More specifically, in FIG. 1, e-UTRAN is a wireless access network capable of providing a VoLTE service. The PS network provides a VoLTE service. The VoLTE service includes the Packet Data Network Gateway (P-GW), Serving Gateway (S-GW), and Mobility Management Entity (MME). The CS network includes the Mobile Switching Center (MSC) and Media Gateway (MGW). The base station subsystem of the CS network includes the Radio Network Controller (RNC) and nodeB. The IMS performs a call control. The IMS includes the Call Session Control Function (CSCF) and Service Centralization and Continuity Application Server (SCC AS). Note that in FIGS. 1 and 2, the MSC and MGW are represented as one node (MSC/MGW 110). However, the MSC and MGW are represented as different nodes.

In FIG. 1, UE 100 and UE 102 (UE: User Equipment), which are mobile communication terminals, are initially connected to the PS network (note that the wireless access network, the base station, and the PS network of the UE 102 are not illustrated). When the UE 100 and UE 102 start a voice call, the Session Setup process is performed. That is, offer/answer of the Session Description Protocol (SDP) for IMS signaling are communicated between the UE 100 and UE 102 and, thus, the codec, for example, used in the voice call is negotiated. FIG. 5 illustrates an example of IMS signaling communication performed in the session setup. The IMS signaling is communicated via IMS nodes (CSCF and SCC AS in FIG. 1) of the network which the two UE are subscribed to (a home network) (not illustrated in FIG. 5). FIG. 6 illustrates the SDP offer/answer. In the example in FIG. 6, AMR and AMR-WB (described below) are offered, and the AMR is selected by the answer. If communication of IMS signaling is completed, a voice call made over VoLTE is started between the UE 100 and the UE 102. At that time, in this example, the handover (HO) of the call of UE 100 to the CS network occurs during an active voice call.

In FIG. 1, Path A, Path B, and Path C shown as solid lines are paths for speech data. In addition, in FIG. 1, paths 200, 202, 204, and 206 shown as dashed lines are the paths for signaling in the SRVCC handover process.

FIG. 2 is a sequence chart illustrating the operation of the SRVCC handover process. Each of the UE 100 and the UE 102 is initially connected to the PS network (e-UTRAN). The speech data is communicated between the UE 100 and the UE 102 via Path A. If the UE 100 moves outside the coverage area of the e-UTRAN, e-nodeB detects that event. Thus, e-nodeB exchanges signaling of the core network with RNC/nodeB via MME and MSC/MGW 110 (signaling 200 illustrated in FIG. 1, step 200 illustrated in FIG. 2 (hereinafter simply referred to as "ST200")). In ST200, after a data path in the CS network is prepared between the nodeB and MSC/MGW 110 and, thereafter, the preparation is completed, an instruction for handover to UTRAN (the CS network) is sent from MME to the UE 100 via e-nodeB.

Concurrently with the process in ST200, the MSC/MGW 110 communicates the signaling of IMS (hereinafter referred to as "IMS signaling") with the UE 102 via CSCF/SCC AS in the home network of the UE 100 (signaling 202 in FIG. 1, ST202 illustrated in FIG. 2). In this manner, an instruction to switch the destination of communication of the speech data of the UE 102 from the UE 100 to the MSC/MGW 110 is sent. Thus, the Path B is established.

After performing handover to UTRAN, the UE 100 exchanges signaling with the MSC/MGW 110 via RNC/nodeB (signaling 204 illustrated in FIG. 1, ST204 illustrated in FIG. 2). In this manner, the Path C is established.

After the Path C is established, the MSC/MGW 110 exchanges signaling with P-GW/S-GW via MME (signaling 206 illustrated in FIG. 1, ST206 illustrated in FIG. 2). In this manner, the Path A is removed.

As described above, the operation of SRVCC handover is performed.

As described above, IMS signaling in the home network is performed. Accordingly, if UE using a roaming service performs SRVCC in a visited network abroad, IMS signaling is sent to the home network although handover occurs in the visited network. Thus, a delay caused by, for example, the distance may occur. To address such an issue related to SRVCC and reduce the time required for data path switching, 3GPP TS22.813 v10.0.0 "Study of Use Cases and Requirements for Enhanced Voice Codecs for the Evolved Packet System (EPS)" describes an SRVCC method using Access Transfer Control Function (ATCF) enhancement (eSRVCC: enhanced-SRVCC). An example of the operations of eSRVCC is described below with reference to FIGS. 3 and 4.

FIG. 3 illustrates part of the configuration of a 3GPP mobile communication network that allows eSRVCC. Like FIG. 1, the mobile communication network illustrated in FIG. 3 includes e-UTRAN, e-nodeB, a PS network, a CS network, a base station subsystem of the CS network, and IMS. The IMS includes Access Transfer Control Function (ATCF) and Access Transfer GateWay (ATGW) in addition to CSCF and SCC AS. Note that in FIGS. 3 and 4, the ATCF and ATGW are represented as one node (ATCF/ATGW 320). However, the ATCF and ATGW are represented as different nodes.

In FIG. 3, each of the UE 100 and the UE 102 is initially connected to the PS network (Note that the wireless access network, the base station, and the PS network for the UE 102 are not illustrated). That is, VoLTE voice call is established between the UE 100 and the UE 102. At that time, the UE 100 performs handover (HO) to the CS network during the voice call.

In FIG. 3, Path A, Path B, and Path C shown as solid lines are paths for speech data. In addition, in FIG. 3, paths 300, 302, 304, and 306 shown as dashed lines are paths for signaling of the SRVCC handover process and IMS signaling.

FIG. 4 is a sequence chart illustrating the operation of the eSRVCC handover process. Each of the UE 100 and the UE 102 is initially connected to the PS network (e-UTRAN). In a system that can provide eSRVCC handover, the ATCF anchors IMS signaling, and the ATGW anchors speech data in the ATCF/ATGW 320. That is, when a voice call between the UE 100 and the UE 102 is initiated, IMS signaling for call initiation is relayed by the ATCF of the network which the UE is connected to (a visited network). If the ATCF determines that the anchor of the speech data in the ATGW is needed, the ATGW of the visited network of the UE is allocated as an anchor point of the speech data. In this manner, the speech data is communicated between the UE 100 and the UE 102 through Path A and Path B.

If the UE 100 moves away from the coverage area of the e-UTRAN, e-nodeB detects that event. Thus, the e-nodeB exchanges signaling with RNC/nodeB via MME and MSC/MGW 110 (signaling 300 illustrated in FIG. 3, ST300 illustrated in FIG. 4). In ST300, a data path in the CS network is prepared between the nodeB and MSC/MGW 110. After the preparation is completed, an instruction for handover to UTRAN (the CS network) is sent from MME to the UE 100 via the e-nodeB.

Concurrently with the process in ST300, the MSC/MGW 110 sends IMS signaling to the ATCF of the visited network of the UE 100. Thus, a path switching instruction is sent from the ATCF to the ATGW of the visited network of the UE 100 and, thus, the destination of communication of the speech data from the ATCF is switched from the UE 100 to the MSC/MGW 110 (signaling 302 illustrated in FIG. 3, ST302 illustrated in FIG. 4). That is, the Path C is established. In addition, when the path switching process to the ATGW is completed, the ATCF sends a notification signaling (IMS signaling) to the SCC AS (signaling 302 illustrated in FIG. 3, ST302 illustrated in FIG. 4).

After handover to UTRAN is completed, the UE 100 exchanges signaling with the MSC/MGW 110 via RNC/nodeB (signaling 304 illustrated in FIG. 3, ST304 illustrated in FIG. 4). In this manner, the Path D is established.

After the Path D is established, the MSC/MGW 110 exchanges signaling with P-GW/S-GW via MME (signaling 306 illustrated in FIG. 3, ST306 illustrated in FIG. 4). In this manner, the Path B is removed.

In the configuration of SRVCC illustrated in FIG. 1, even when, for example, the UE 100 that is subscribed to a Japanese cellular carrier roams to a mobile phone network in a country in Europe and make a phone call with UE 102 that is visited in the same country in Europe and if handover to a CS network occurs, IMS signaling between the MGW and the UE 102 is communicated via Japan. Accordingly, it takes a long time for the signaling between MGW and the UE 102. In contrast, in eSRVCC illustrated in FIG. 3, the MGW and the ATCF are generally located in the same country and are located in the vicinity of each other. In addition, the signaling is communicated only between the MGW and the ATCF, and signaling communicated with the UE 102 is not needed. As a result, the time required for data path switching can be reduced.

As described above, the operation of the eSRVCC handover is performed.

Examples of the speech codec used in a CS network include the Adaptive Multi-Rate (AMR) codec, which is Narrowband (NB) codec, and the Adaptive Multi-Rate Wideband (AMR-WB) codec, which is Wideband (WB) codec. The AMR and AMR-WB can be used in a packet switched system. Accordingly, AMR and AMR-WB can be used in the PS network (VoLTE).

In addition, a codec in Enhanced Voice Service (EVS) described in, for example, 3GPP TS22.813 v10.0.0 can be used in the PS network (VoLTE).

Note that the Narrowband (NB) codec mentioned above in the literature in the citation list is a codec used to perform coding and decoding processes on a digital audio signal sampled at 8 kHz. Also note that in general, the digital audio signal has an audio bandwidth from 300 Hz to 3.4 kHz. However, the bandwidth is not limited thereto. The bandwidth may be any bandwidth within the range from 0 to 4 kHz. In addition, the Wideband codec is a codec used to perform coding and decoding processes on a digital audio signal sampled at 16 kHz. Note that the digital audio signal has a bandwidth from 50 Hz to 7 kHz. However, the bandwidth is not limited thereto. The bandwidth may be any bandwidth within the range from 0 Hz to 8 kHz. Furthermore, the Super Wideband (SWB) codec is a codec that performs coding and decoding processes on a digital audio signal sampled at 32 kHz. In general, the digital audio signal has a bandwidth from 50 Hz to 14 kHz. However, the bandwidth is not limited thereto. The bandwidth may be any bandwidth within the range from 0 Hz to 16 kHz.

SUMMARY

In FIG. 1 or 3, when the UE 100 performs handover from the PS network to the CS network and if the codec used in the PS network is not supported by the CS network, the codec used by the UE 100 is changed to a codec that is supported by the CS network. To allow the voice call between the UE 100 and the UE 102 to continue when the codec used by the UE 100 is changed, the following two techniques can be employed. That is, a first technique is transcoding performed in the MSC/MGW or in the ATCF/ATGW. A second technique is to make the codec used by the UE 102 the same as the codec of the UE 100 after the change.

In the first technique of performing transcoding, the MSC/MGW or the ATCF/ATGW needs to support transcoding. In addition, the quality of the voice call is degraded due to the transcoding.

In contrast, in the second technique of changing the codec, the codec of the UE 102 is changed. Thus, codec re-negotiation through IMS signaling is needed. However, since in the eSRVCC handover, IMS signaling for path switching in the handover of the UE 100 is terminated at the ATCF, the IMS signaling for changing the codec of the UE 102 cannot be transmitted.

International Patent Application No. 2012/017951 describes a technique for detecting whether the UE has a function to hand over to the CS even when the network employs the eSRVCC method, that is, whether the UE supports SRVCC and preventing the communication path from being anchored in the ATGW if the UE does not support SRVCC. In addition, 3GPP TS22.813 v10.0.0 describes a technique for handling the communication as in normal SRVCC even in the eSRVCC method (even when IMS signaling passes through the ATCF). That is, the communication path is not anchored at the ATGW. If one of the UE devices performs handover to the CS network, IMS signaling is communicated with the other UE device from the MGW via the ATCF (ATCF without media anchored in ATGW). However, according to the technique described in International Patent Application No. 2012/017951, it is determined whether IMS signaling is sent to the other UE device on the basis of whether the UE supports SRVCC, regardless of the type of codec used by the UE. In addition, 3GPP TS22.813 v10.0.0 does not mention in what case the eSRVCC is handled as the normal SRVCC.

One non-limiting and exemplary embodiment provides a network node capable of, when a first terminal being in communication with a second terminal performs handover with a codec change, changing the codec of the second terminal and continuing to communicate with the second terminal and a signaling processing method for use in the network node.

In session setup, the ATCF that anchors the IMS signaling examines the information regarding SDP offer/answer and compares the codec used in voice call initiation with a codec used by the CS to which UE can perform handover. If the ATGW does not have the transcoding function or if transcoding in the ATGW is not wanted, a method in which the communication path is not anchored in the ATGW and the processing is performed as in the normal SRVCC is selected. If the handover of the first UE to a CS occurs, re-negotiation of codec is performed with the second UE through SDP offer/answer communication using the IMS signaling again.

Alternatively, even in the normal eSRVCC in which the communication is anchored in the ATGW, if UE performs handover to the CS and the codec is changed, codec re-negotiation is performed with the second UE again through SDP offer/answer communication using the IMS signaling if the ATGW has no transcoding function or if transcoding of the ATGW is not wanted.

In one general aspect, the techniques disclosed here feature a network node having at least Access Transfer Control Function (ATCF) for use in eSRVCC (enhanced Single Radio Voice Call Continuity). The network node includes a receiving unit that receives SDP (Session Description Protocol) offer or SDP answer included in IMS (IP Multimedia Subsystem) signaling, an SDP analyzing unit that acquires information regarding a codec contained in the SDP offer or the SDP answer, a data storage unit, and a determination unit. The data storage unit holds at least one of information regarding a codec supported by ATGW (Access Transfer Gateway) or a neighboring MGW (Media Gateway), information regarding transcoding supported by the ATGW or the neighboring MGW, and information regarding a codec supported by a neighboring CS (Circuit Switched) network. The determination unit determines whether transmission of the SDP offer for codec re-negotiation from the ATCF to a communication terminal is allowed using the information regarding a codec acquired in the SDP analyzing unit and information retrieved from the data storage unit.

A network node capable of, when a first terminal being in communication with a second terminal performs handover with a codec change, changing the codec of the second terminal and continuing the communication and a signaling processing method for use in the network node can be provided.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 illustrates SDP offer/answer exchanged in the session setup;

DETAILED DESCRIPTION

Embodiments of the present disclosure are described in detail below with reference to the accompanying drawings. Note that in the embodiments of the present disclosure, UE supports the SRVCC, and the ATCF/ATGW has acquired that information. To acquire the information as to whether the UE supports the SRVCC, the ATCF/ATGW may employ a method described in International Patent Application No. 2012/017951.

First Embodiment

Figure 1:
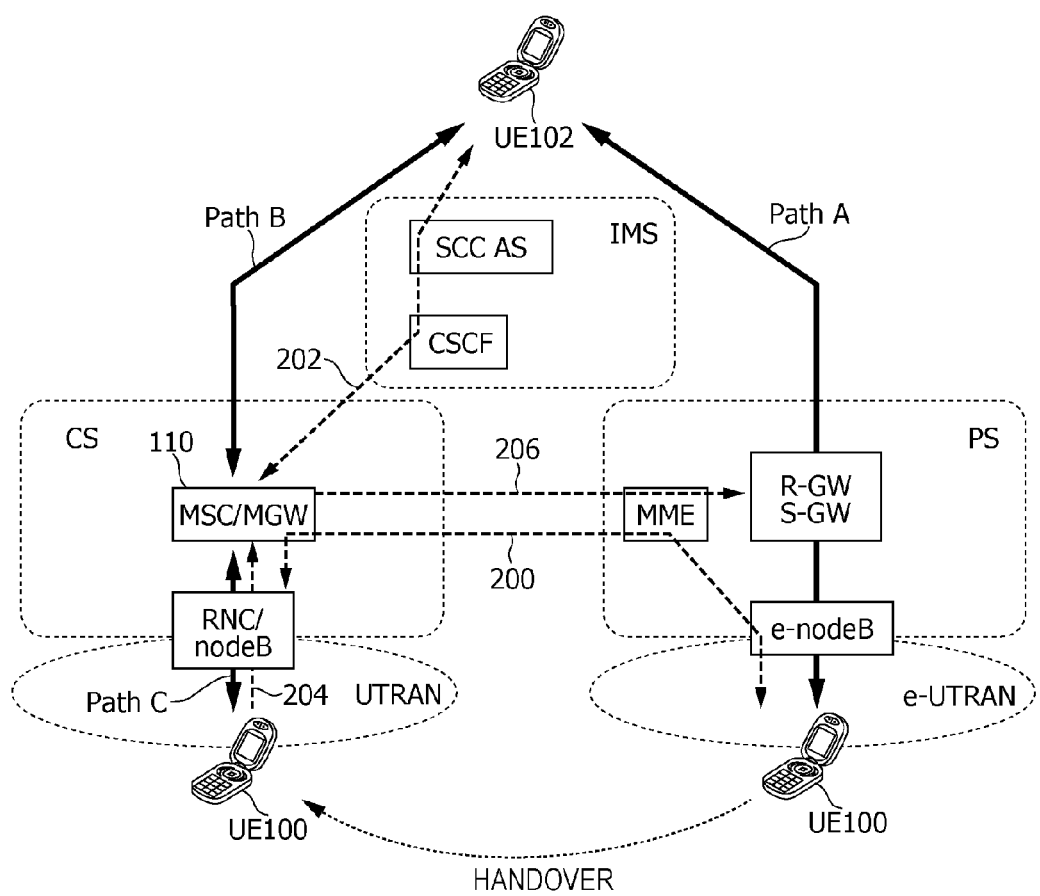
FIG. 1 is a configuration diagram of a mobile communication network in SRVCC.
Figure 2:
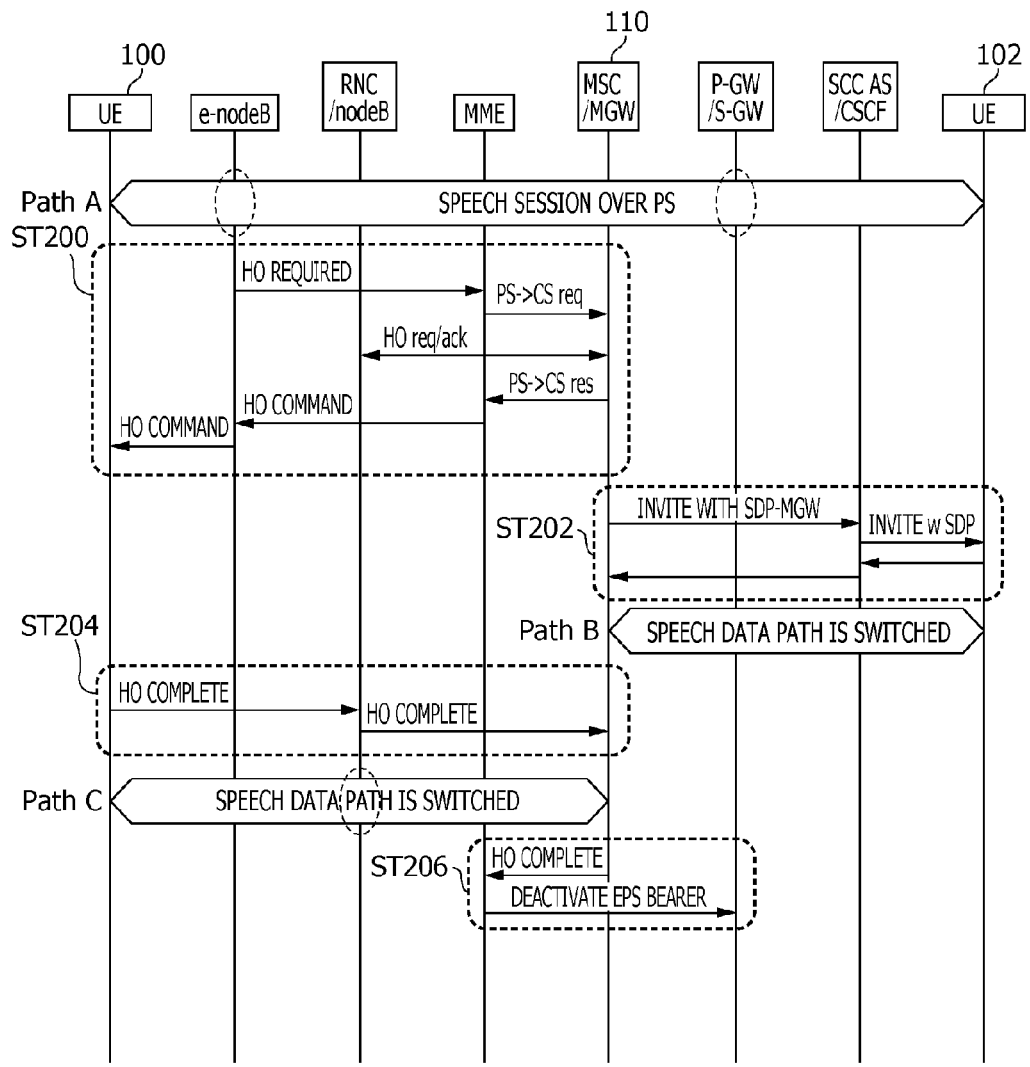
FIG. 2 illustrates a handover operation performed in the SRVCC.
Figure 3:
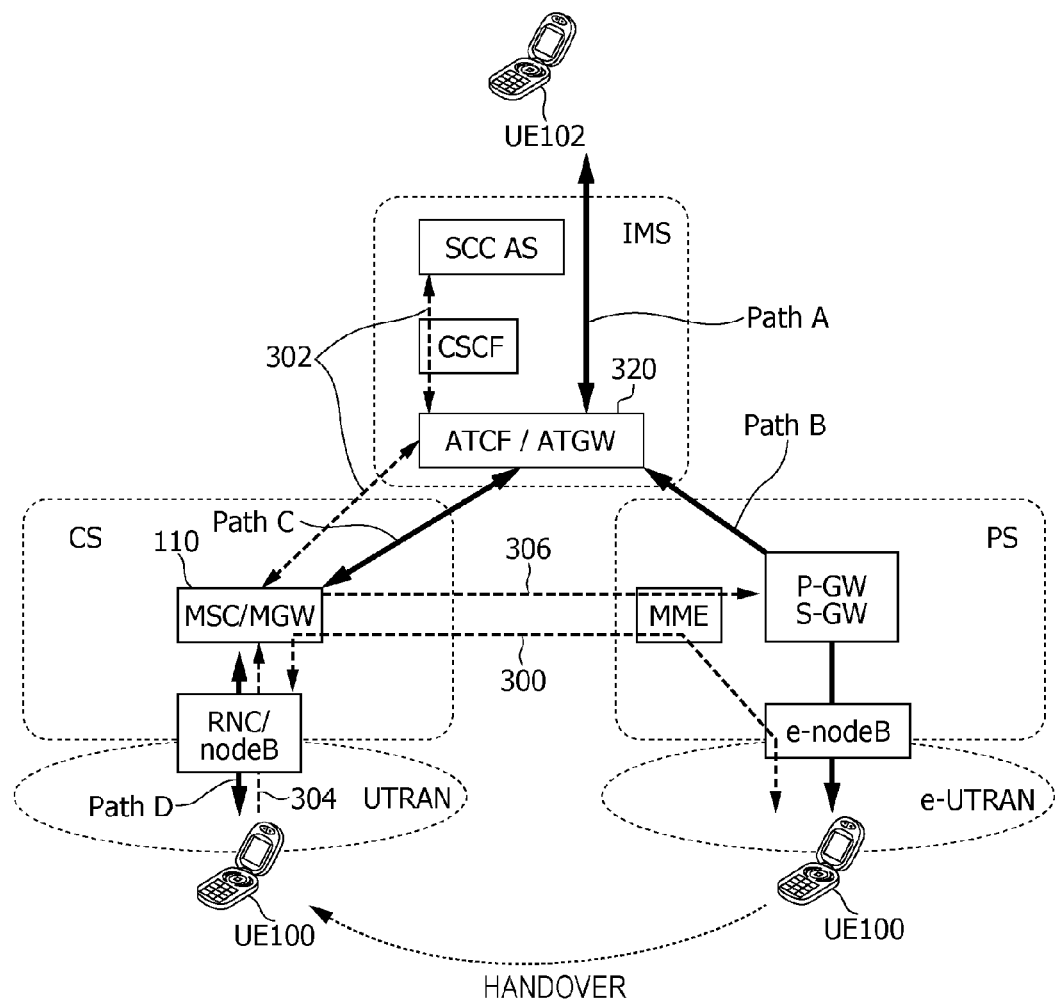
FIG. 3 is a configuration diagram of a mobile communication network in eSRVCC.
Figure 4:
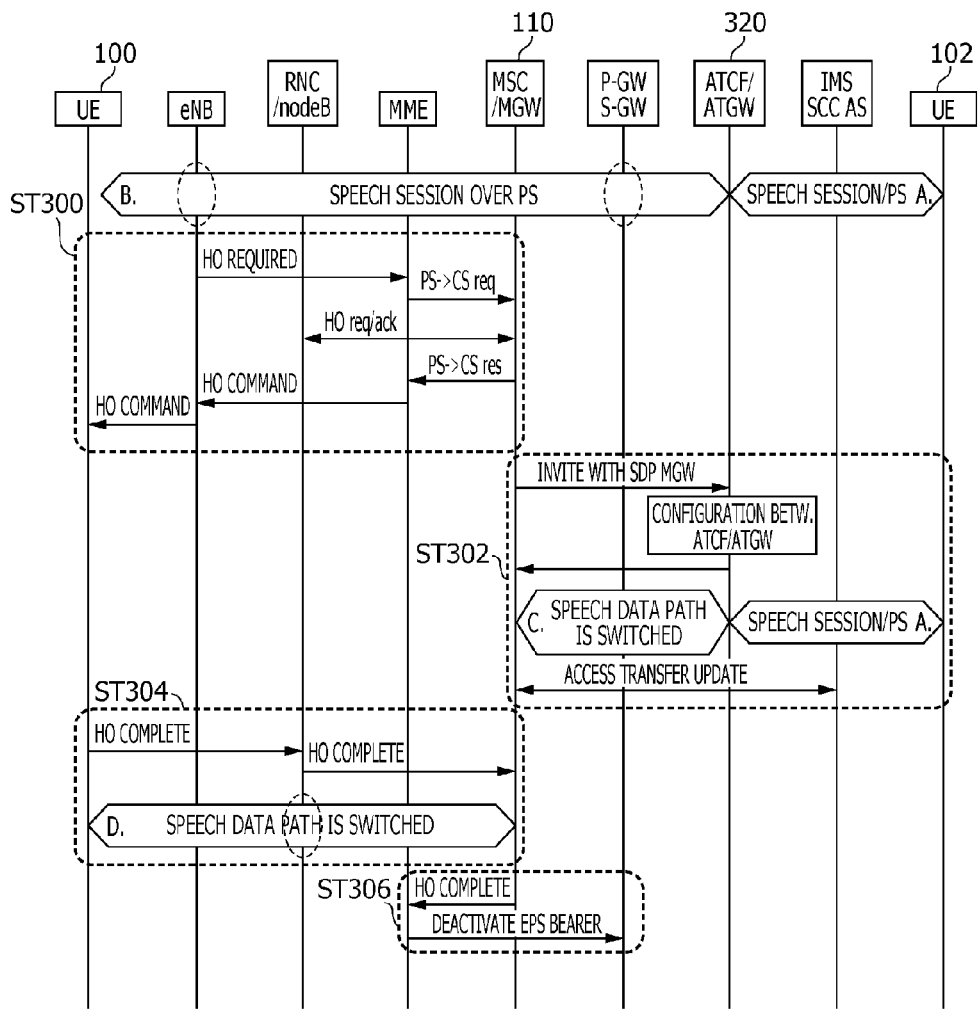
FIG. 4 illustrates the handover operation in the eSRVCC.
Figure 5:
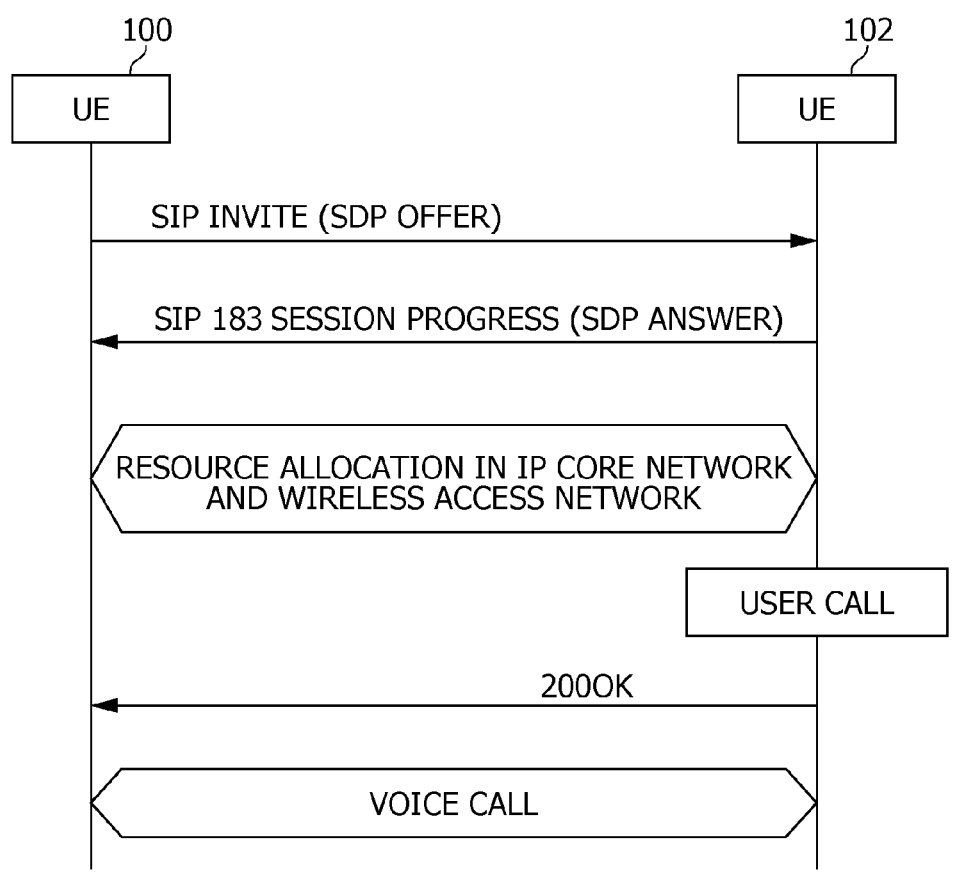
FIG. 5 illustrates IMS signaling communication performed in session setup.
Figure 7:
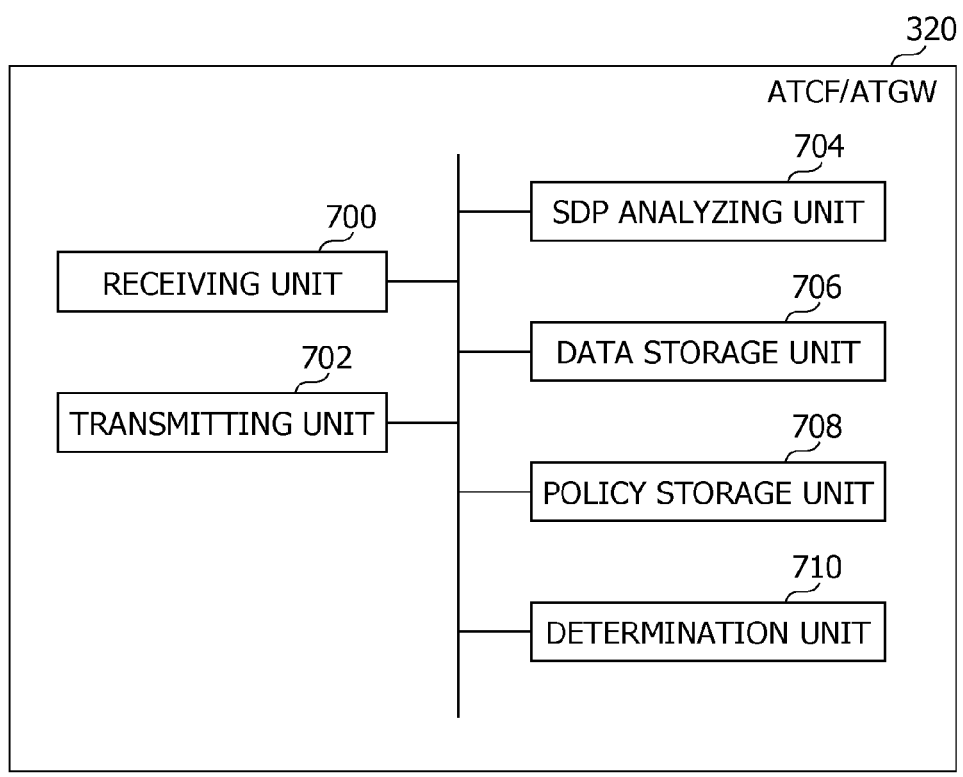
FIG. 7 is a configuration diagram of a network node according to the present disclosure.

A first embodiment is described with reference to FIG. 7 to FIG. 9. FIG. 7 is a block diagram of, in particular, an ATCF portion of an ATCF/ATGW 320 according to the present embodiment.

A receiving unit 700 receives, for example, IMS signaling. In addition, a transmitting unit 702 transmits, for example, IMS signaling.

Note that in addition to the IMS signaling that the UE, which is a communication terminal, communicates in the session setup, the IMS signaling includes IMS signaling that is communicated when the UE performs handover.

An SDP analyzing unit 704 analyzes the information in the SDP offer and SDP answer included in the IMS signaling. For example, the SDP analyzing unit 704 analyzes the SDP offer and the SDP answer to acquire the speech codec information used during a voice call.

A data storage unit 706 stores the Capability of the ATCF/ATGW 320 itself and the Capability of the neighboring MGW. For example, the data storage unit 706 stores the information regarding the codec that the ATCF/ATGW 320 and MGW support, the information regarding the codec that a neighboring CS network supports, and the information regarding the transcoding that the ATCF/ATGW 320 and MGW support (the information regarding a combination of codecs that can be transcoded).

Note that the information regarding a neighboring MGW and a neighboring CS network may be acquired by the ATCF/ATGW 320 and MGW exchanging signaling messages directly or via another network node with each other. Alternatively, the data may be manually stored in advance.

A policy storage unit 708 stores the policy regarding service offering. For example, the policy storage unit 708 stores, for example, a policy indicating whether for example, two UE devices being in communication with each other are allowed to use different codecs and, thus, transcoding is performed by the ATCF/ATGW 320 and the MGW or two UE devices being in communication with each other use the same codec and, thus, transcoding is not performed.

A determination unit 710 determines whether transmission of SDP offer for codec re-negotiation from the ATCF to the UE is enabled by using the result of analysis performed by the SDP analyzing unit 704, the data stored in the data storage unit 706, and the policy stored in the policy storage unit 708. More specifically, the determination unit 710 determines whether the communication is anchored in the ATGW or a change in codec is allowed by communicating the IMS signaling with the UE 102 without anchoring the communication in the ATGW.

Figure 8:
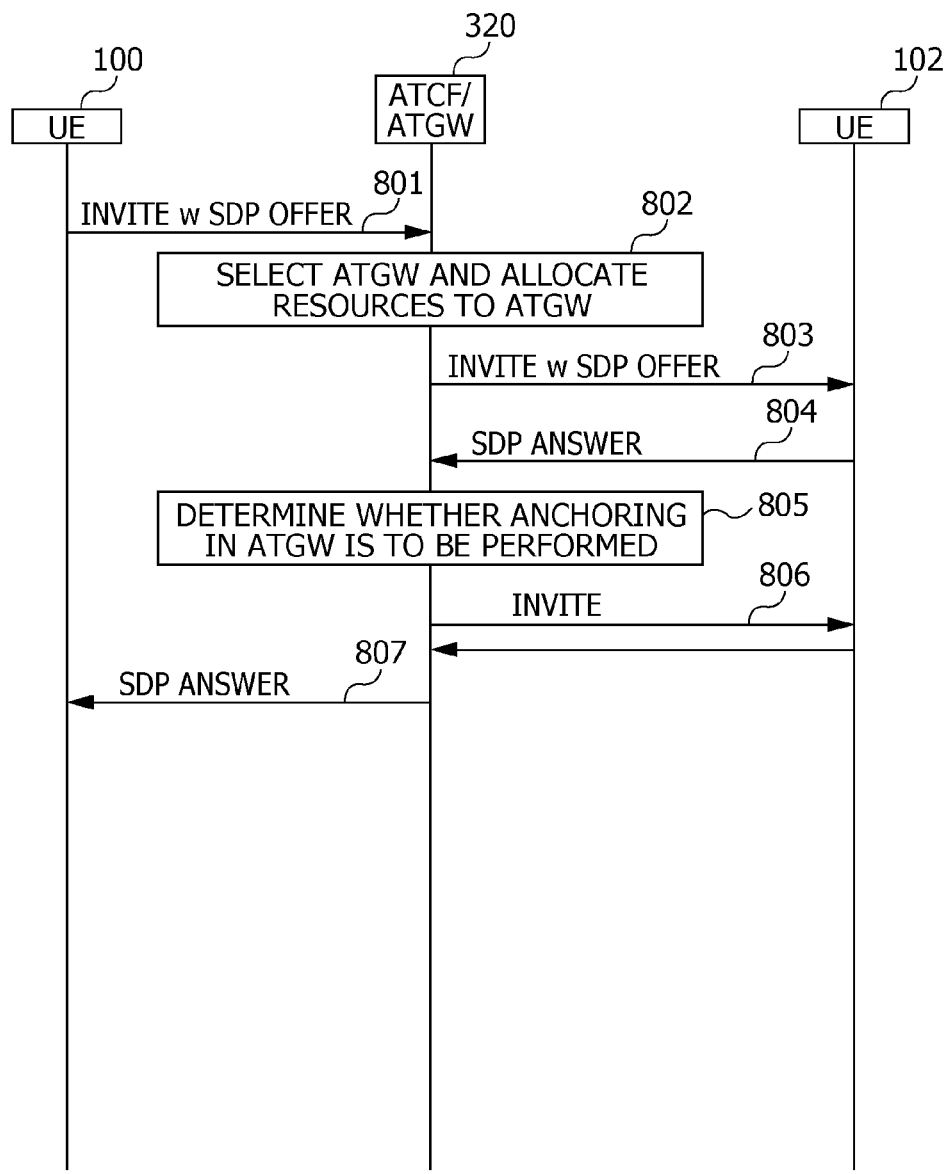
FIG. 8 illustrates a session setup operation according to a first embodiment of the present disclosure.
Figure 9:
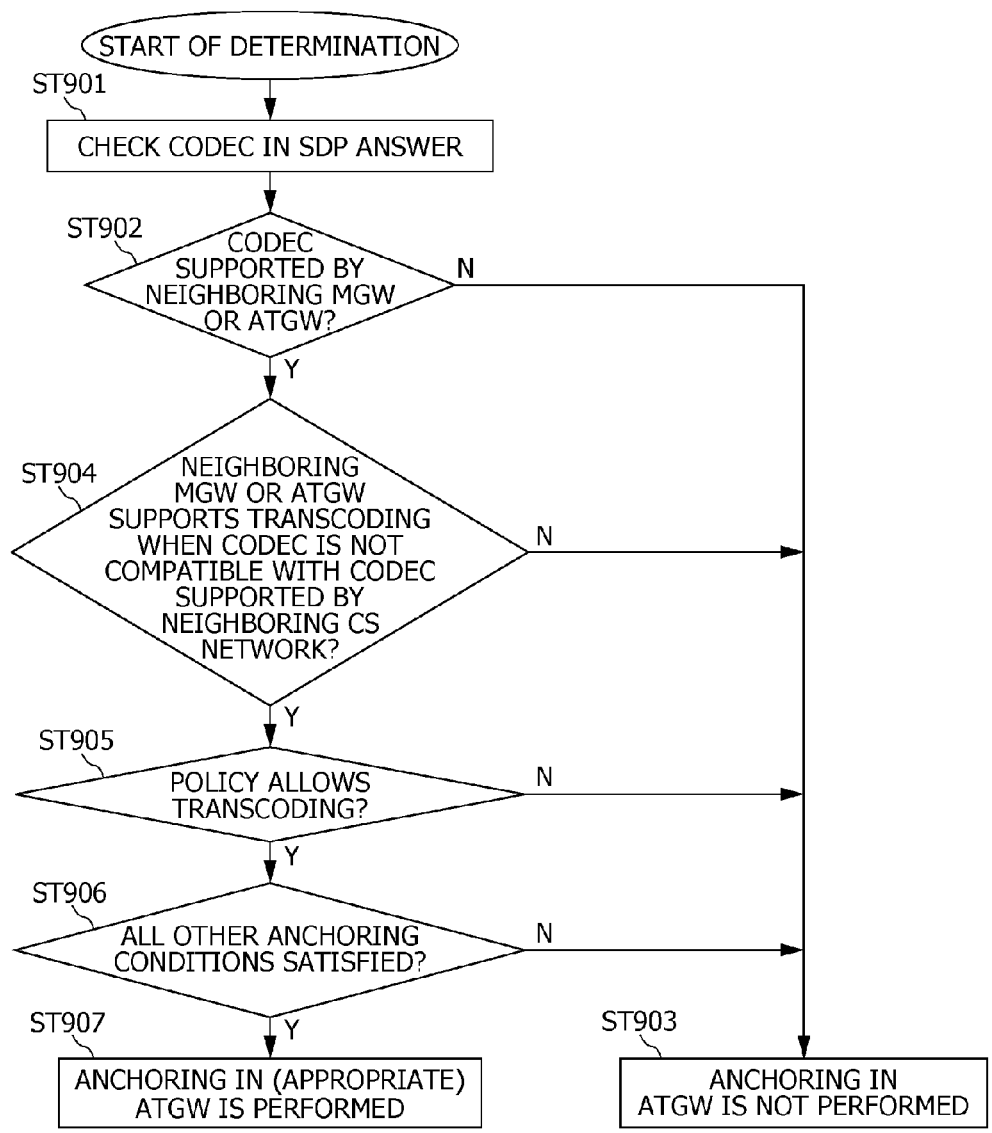
FIG. 9 illustrates an operation performed by a network node according to the first embodiment of the present disclosure.

FIG. 8 is a sequence chart illustrating an example of session setup according to the first embodiment of the present disclosure. An Invite message with SDP offer (IMS signaling) sent from UE 100 is further sent to the ATCF/ATGW 320 (more precisely, only ATCF) via another network node (not illustrated) (801).

As described in 3GPP TS22.813 v10.0.0, the ATCF selects the ATGW and allocates a resource (802).

Subsequently, the ATCF/ATGW 320 sends an Invite message with the SDP offer to the UE 102 via another network node (not illustrated) (803). At that time, the ATGW is specified as the communication partner of the UE 102.

Subsequently, the UE 102 sends an SDP answer together with IMS message to the ATCF/ATGW 320 via another network node (not illustrated) (804). Upon receiving the SDP answer, the determination unit 710 of the ATCF/ATGW 320 determines whether the communication is to be anchored in the selected ATGW using the information in the SDP answer, the data stored in the data storage unit 706, and the policy stored in the policy storage unit 708 (805). An example of the determination method employed by the determination unit 710 is illustrated in FIG. 9.

The determination unit 710 determines which codec is selected in the SDP answer first (ST901).

Subsequently, the determination unit 710 determines whether the codec selected in the SDP answer is a codec usable when UE performs handover to the CS network (a codec supported by the neighboring CS network). If the codec is a codec usable in the CS network and an existing criterion that determines anchoring of communication in the ATGW (e.g., the determination criterion described in International Patent Application No. 2012/017951) is satisfied, the communication is anchored in the ATGW. However, the determination criterion is not satisfied, the communication is not anchored in the ATGW (not illustrated).

However, if the codec selected in the SDP answer is not a codec usable when the UE performs handover to the CS network, it is determined whether the codec is a codec supported by the ATGW or supported by a neighboring MGW and usable when the UE performs handover (ST902). If the codec is not supported, the processing related to the codec (e.g., transcoding) cannot be performed. Accordingly, it is determined that the communication is not anchored in ATGW, that is, if the UE performs handover to the CS network and the codec is changed, IMS signaling for codec re-negotiation is communicated with the UE 102 so that the UE 102 uses the same codec as the UE 100 (ST903). However, if the codec is a codec supported by the ATGW or the neighboring MGW, it is determined whether the codec supported by the CS network to which the UE can perform handover is compatible with the selected codec. If the codec has no compatibility, it is determined whether transcoding is supported (ST904).

If transcoding is not supported, it is determined that the communication is not anchored in ATGW (ST903). In addition, even when transcoding is supported, the policy that determines whether transcoding is allowed (whether transcoding is used) is examined (ST905). If the policy does not allow transcoding, it is determined that the case corresponds to a case in which transcoding is not performed and, thus, it is determined that the communication is not anchored in the ATGW (ST903). That is, when the UE performs handover to the CS network and if the codec is changed, IMS signaling for codec re-negotiation is communicated with the UE 102 so that the UE 102 can use the same codec as UE 100.

In addition, even when transcoding is supported and the policy allows transcoding, it is determined whether all other conditions for anchoring the communication in ATGW are satisfied (ST906). For example, when the selected codec is compatible with the codec supported by a neighboring CS network, it is determined whether as described in International Patent Application No. 2013/080471, the codec has a function to switch to a compatibility mode without communicating IMS signaling with the UE 102 (without session re-negotiation for switching the RTP payload format). If the codec has not such a function or if the policy is not present although the codec has the function, it is determined that the communication is not anchored in ATGW (ST903). That is, when the UE performs handover to the CS network and the codec is changed, it is determined that IMS signaling for the codec re-negotiation is communicated with the UE 102 so that the UE 102 can use the same codec as the UE 100. When the codec has a function to perform its operation without transcoding without communicating IMS signaling with the UE 102 and if the policy to use the function is present and all the other conditions to anchor the communication in the ATGW are satisfied, it is determined that IMS signaling to be communicated with the UE 102 for codec re-negotiation is not needed in order for the UE 102 to use the same codec as the UE 100 even when the UE performs handover to the CS network and the codec is changed. Thus, the communication is anchored in the ATGW (ST907).

If it is determined that the communication is anchored in the ATGW (ST907), IMS signaling is communicated so that the destination of the communication performed by the UE 100 and the UE 102 is the selected ATGW, as described in 3GPP TS22.813 v10.0.0.

However, if it is determined that the communication is not anchored in the ATGW (ST903), the ATCF/ATGW 320 sends an IMS message to UE 102 again, as illustrated in FIG. 8 (806). Thus, an instruction indicating that the destination of communication performed by the UE 102 is not the ATGW and is to be switched to the UE 100 is sent to the UE 102. In addition, the IMS signaling sent to the UE 100 specifies the UE 102 as the communication partner of the UE 100 in addition to the selected codec (an SDP answer) (807). Furthermore, at this time, the resources allocated to the ATGW are released.

As described above, in the case where the UE 100 performs handover to the CS network after the session setup according to the present embodiment, even when the codec after the change is not compatible with the previous codec and the MGW and ATGW do not support or not allow transcoding or even when although the compatibility is ensured, switching to a compatibility mode is not supported or not allowed without communicating the IMS signaling with the UE 102 (without session re-negotiation for switching the RTP payload format), the communication can be continued by communicating IMS signaling between the ATCF/ATGW and the UE 102 and re-negotiating a codec.

Second Embodiment

Figure 10:
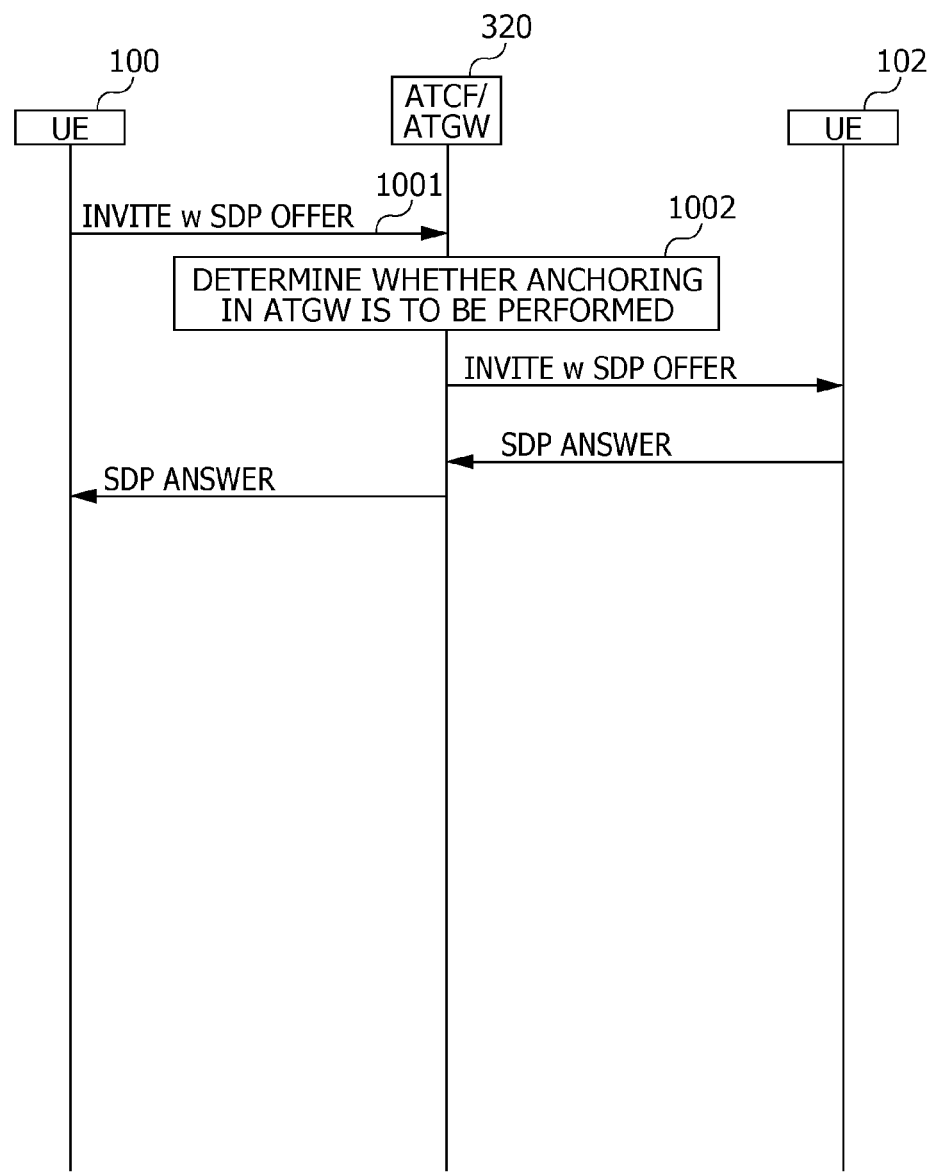
FIG. 10 illustrates a session setup operation according to a second embodiment of the present disclosure.

The second embodiment is described with reference to FIG. 7 and FIGS. 10 to 11. FIG. 7 is a block diagram illustrating the configuration of an ATCF/ATGW 320 according to the present embodiment. The block diagram is similar to that of the first embodiment. FIG. 10 is a sequence chart illustrating an example of the session setup according to the second embodiment of the present disclosure.

An Invite message (IMS signaling) with SDP offer sent for UE 100 is further sent to an ATCF/ATGW 320 (more precisely, only the ATCF) via another network node (not illustrated) (1001). Thereafter, the ATCF/ATGW 320 determines whether the communication is anchored in the ATGW from the SDP offer (1002). For example, the determination unit 710 of the ATCF/ATGW determines whether the policy used to determine whether the communication is anchored in the ATGW is stored in the policy storage unit 708 from the information in the SDP offer, and the determination is made. If the determination as to whether the communication is anchored in the ATGW is not made from the information in the SDP offer, the determination is made from the SDP answer, as in the first embodiment.

Figure 11:
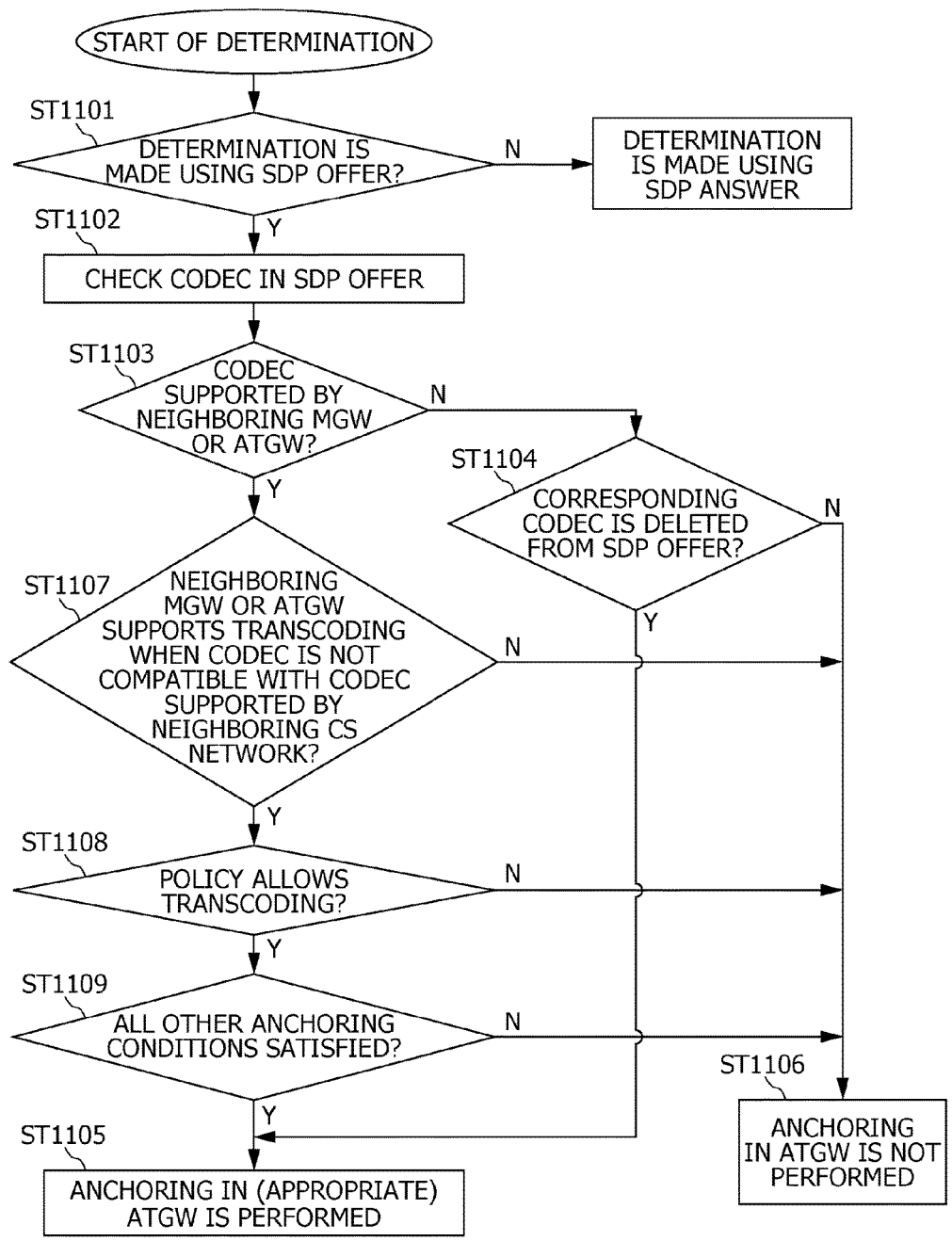
FIG. 11 illustrates the operation performed by a network node according to the second embodiment of the present disclosure.

FIG. 11 illustrates an example of a determination method for use in the determination unit 710 of the ATCF/ATGW 320 according to the present embodiment. That is, if the determination is made from the SDP offer (ST1101), the SDP analyzing unit 704 analyzes the codecs in the SDP offer (ST1102). At that time, if the analyzed codecs include a codec not supported by the ATCF/ATGW 320 or the neighboring MGW (ST1103), the determination unit 710 asks the policy storage unit 708 whether the codec is deleted from the SDP offer and only the supported codecs remain (only the codecs capable of continuing the communication without codec re-negotiation with the UE 102 even when the UE 100 performs handover to the neighboring CS network) (ST1104). If the codec is to be deleted, it is determined that the communication is anchored in the ATGW (ST1105). That is, an ATGW that anchors the communication is selected, and the resources are allocated to the ATGW. In addition, an SDP from which the codec is removed is generated by, for example, the SDP analyzing unit 704, and the SDP is sent to the UE 102 through IMS signaling communicated with the ATGW. In addition, upon receipt of an SDP answer from the UE 102, the SDP answer is sent to the UE 100 through IMS signaling communicated with the ATGW. In contrast, if the codec is not deleted from the SDP offer, the processing related to the codec, such as transcoding, cannot be performed. Accordingly, it is determined that the communication is not anchored in the ATGW (ST1106). That is, selection of ATGW and resource allocation to the ATGW are not carried out, and IMS signaling is sent to the UE 102 using the UE 100 as a communication partner. Upon receipt of the SDP answer from the UE 102, IMS signaling is sent to the UE 100 using the UE 102 as a communication partner.

In addition, even when the codec is deleted from the SDP offer, it may be determined whether the communication is anchored in the ATGW by applying the determination criterion described in the first embodiment (e.g., the policy for the transcoding) without immediately determining that the communication is anchored in the ATGW.

Furthermore, if the information in the SDP offer sent from the UE 100 indicates that although all of the codecs are supported by the ATCF/ATGW 320 and the neighboring MGW, a codec that is not supported by the neighboring CS network is included, it is determined whether the communication is anchored in the ATGW using a method that is the same as in the first embodiment (ST1107, ST1108, ST1109).

According to the present embodiment, like the first embodiment, it is determined whether the communication is anchored in the ATGW when the SDP answer is received. If the communication is not anchored, the procedure for switching the communication partner of the UE 102 from the ATGW to the UE 100 can be eliminated. Thus, the time required for session setup can be reduced, as compared with in the first embodiment.

Third Embodiment

According to the present embodiment, an ATCF/ATGW 320 has a function of sending IMS signaling from the ATCF/ATGW 320 to the UE 102 if the codec re-negotiation with the UE 102 is needed due to handover of the UE 100 to the CS network even in the case in which the communication is anchored in the ATGW in session setup.

The present embodiment is described below with reference to FIG. 7 and FIGS. 12 to 13. FIG. 7 is a block diagram illustrating the configuration of a ATCF/ATGW 320 according to the present embodiment. The configuration is similar to that in the first embodiment.

Figure 12:
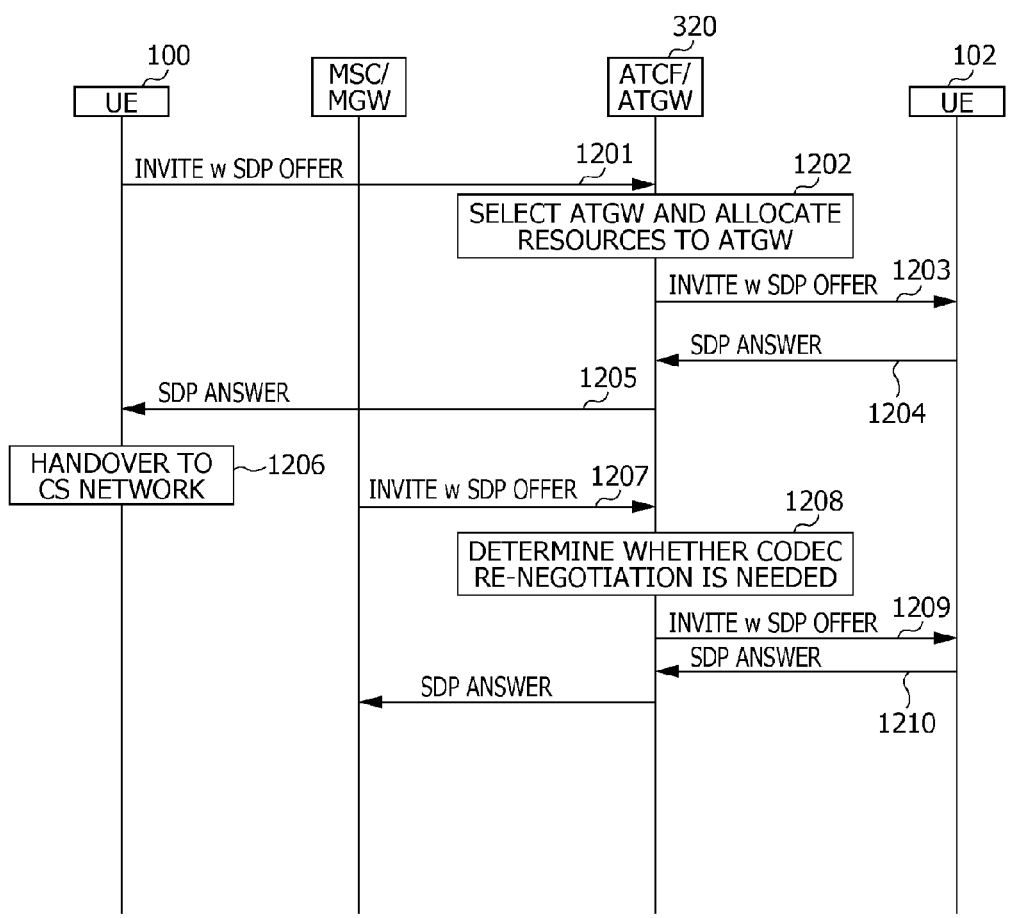
FIG. 12 illustrates the session setup operation and the handover operation according to a third embodiment of the present disclosure.
Figure 13:
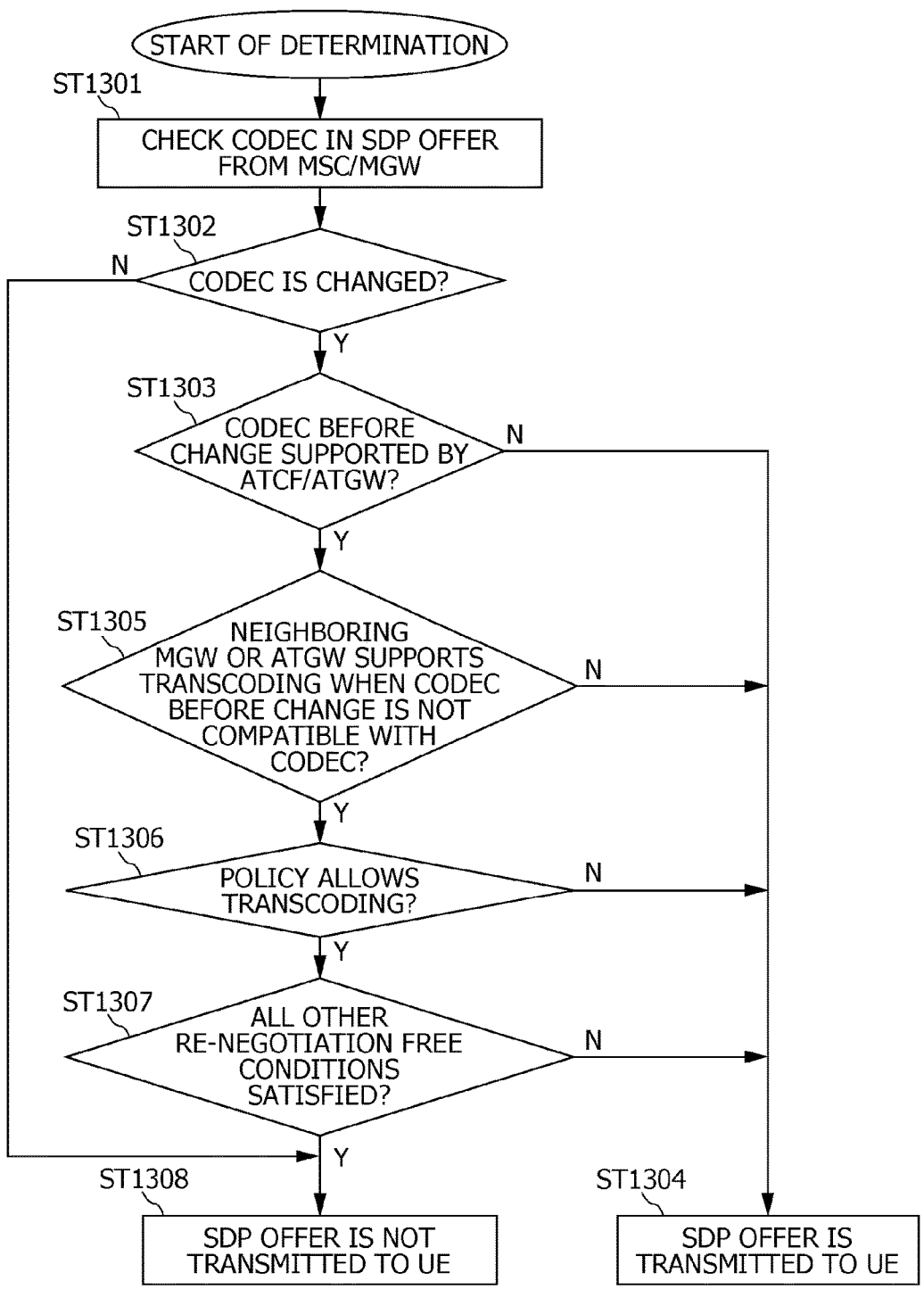
FIG. 13 illustrates the operation performed by a network node according to the third embodiment of the present disclosure.

FIG. 12 is a sequence chart illustrating an example of the session setup and a handover of the UE 100 to a CS network according to the third embodiment of the present disclosure. An Invite message with SDP offer (IMS signaling) sent from UE 100 is further sent to ATCF/ATGW 320 (more precisely, only ATCF) via another network node (not illustrated) (1201). As described in 3GPP TS22.813 v10.0.0, the ATCF selects an ATGW and allocates the resources (1202).

Subsequently, the ATCF/ATGW 320 transmits an Invite message with the SDP offer to the UE 102 via another network node (not illustrated) (1203). At that time, the ATGW is specified as the communication partner of the UE 102.

Subsequently, the UE 102 sends an SDP answer together with IMS message to the ATCF/ATGW 320 via another network node (not illustrated) (1204). Upon receipt of the SDP answer, the ATCF/ATGW 320 sends the SDP answer to the UE 100 via another network node (not illustrated), as described in 3GPP TS22.813 v10.0.0 (1205). At that time, the ATGW is specified as the communication partner of the UE 100. That is, the ATCF/ATGW 320 causes the communication to be anchored in the ATGW without analyzing the SDP offer and answer.

Subsequently, assume that the UE 100 performs handover to the CS network, and the communication path to the MSC/MGW is established via the CS network using the method described in 3GPP TS23.216 v12.6.0 (1206). As described in 3GPP TS22.813 v10.0.0, the MSC/MGW sends the Invite message with the SDP offer to the ATCF/ATGW 320 (1207).

Upon receipt of the message, the determination unit 710 of the ATCF/ATGW 320 determines whether transmission of the SDP offer for codec re-negotiation from the ATCF to the UE is allowed using the information in the SDP offer, the data stored in the data storage unit 706, and the policy stored in the policy storage unit 708. More specifically, the determination unit 710 determines whether the IMS signaling for codec re-negotiation (Invite message with the SDP offer) is sent to the UE 102 (1208). An example of the determination method for use in the determination unit 710 is illustrated in FIG. 13.

The determination unit 710 determines whether the codec used by the UE 100 before handover is included in the codecs selected in the SDP offer first (ST1301, ST1302). If the codec is included, the IMS signaling (the SDP offer) is not sent to the UE 100, and the communication continues without changing the codec using the method described in 3GPP TS22.813 v10.0.0.

If the codec used by the UE 100 before handover is not included in the codecs selected in the SDP offer, it is determined whether the IMS signaling is communicated with the UE 102 using a method that is the same as in the first embodiment and, thus, the codecs are made the same by exchanging the SDP offer and answer again. That is, it is determined whether the codec used by the UE 100 before handover is supported by the ATGW (ST1303). If the codec is not supported, the processing related to the codec (e.g., transcoding) cannot be performed. Accordingly, it is determined that the IMS signaling is sent to the UE 102 to re-negotiate a codec (ST1304). However, if the ATGW supports the codec used by the UE 100 before handover, it is determined whether among the codecs in the SDP offer, a codec having compatibility with the codec used by the UE 100 before handover is present. If all the codecs do not have the compatibility, it is determined whether the ATCF/ATGW supports the transcoding (ST1305).

If the transcoding is not support, it is determined that the IMS signaling is sent to UE 102 to re-negotiate a codec (ST1304). Even when the transcoding is supported, it is determined whether the policy allows transcoding (ST1306). If the policy does not allow transcoding, it is determined that the IMS signaling is sent to the UE 102 to re-negotiate a codec (ST1304). Furthermore, even when the policy allows transcoding, the IMS signaling is sent to the UE 102 to determine whether the conditions for eliminating the need for the codec re-negotiation are satisfied (ST1307). For example, even when a codec having compatibility with the codec used before the UE 100 performs handover is included in the SDP offer, it is determined whether the codec has a switching function to a compatible mode without communicating IMS signaling with the UE 102 (without session re-negotiation for switching the RTP payload format), as described in International Patent Application No. 2013/080471. If the codec has not the function or if the policy is not present although the codec has the function, it is determined that the IMS signaling is sent to the UE 102 (ST1304). If all the conditions for eliminating the need for the codec re-negotiation are satisfied, the ATCF/ATGW 320 does not send the IMS signaling to the UE 102 (ST1308) and selects an appropriate codec from the SDP offer. Thereafter, the ATCF/ATGW 320 sends back the SDP answer to MSC/MGW and changes the destination of communication of the ATGW from the UE 100 to the MGW.

According to the present embodiment, in the case where the UE 100 performs handover to the CS network and the used codec is changed, even when a new codec is not compatible with the previous codec and the MGW and ATGW do not support transcoding or even when although the compatibility is ensured, switching is not supported without session re-negotiation of the RTP payload format, the communication can be continued by communicating IMS signaling between the ATCF/ATGW and the UE 102 and re-negotiating a codec without changing the session setup method described in 3GPP TS22.813 v10.0.0.

The embodiments of the present disclosure have been described above.

It should be noted that while each of the above embodiments has been described with reference to the ATCF/ATGW 320, MSC/MGW 110, and SCC AS/CSCF each forming one node, the present disclosure is not limited thereto. The ATCF/ATGW 320, MSC/MGW 110, and SCC AS/CSCF may be formed from two or more different nodes connected with one another using an interface. That is, the above-described function may be distributed in a plurality of nodes between the ATCF and ATGW, between the MSC and MGW, and between the SCC AS and the CSCF. Conversely, the above-described functions of the ATCF/ATGW 320 and MSC/MGW 110 may be performed in a single node.

In addition, while each of the above embodiments has been mainly described with reference to a speech codec, the present disclosure is not limited thereto. The above-described embodiments is applicable to codecs for, for example, music, audio, and an image.

Note that the operation flow diagrams of FIGS. 8 to 13 illustrate the operation (the method) in hardware exclusively designed for the present disclosure. In addition, the operation flow diagrams includes an operation flow in the case in which a program that performs the operation (the method) according to the present disclosure is installed in general-purpose hardware and is executed by a processor. Example of a computer representing the general-purpose hardware include a variety of mobile information terminals, such as a personal computer and a smartphone, and a cell phone.

Moreover, the hardware that is exclusively designed is not limited to the finished products (consumer electronics), such as cell phones and land-line phones. The hardware includes semi-finished products and parts, such as system boards and semiconductor elements.

The present disclosure is not limited to the foregoing embodiments and can be modified in various ways.

The network node according to the present disclosure is effective when speech codec is handled and when a codec used for a music signal or the like and a codec used for an image signal are handled.

What is claimed is:

1. A network node having Access Transfer Control Function (ATCF) for use in enhanced Single Radio Voice Call Continuity (eSRVCC) comprising:

a receiver that receives Session Description Protocol (SDP) offer or SDP answer included in IP Multimedia Subsystem (IMS) signaling;

an SDP analyzer that acquires information regarding a codec contained in the SDP offer or the SDP answer;

a data storage that holds at least one of information regarding a codec supported by Access Transfer Gateway (ATGW) or a neighboring Media Gateway (MGW), information regarding transcoding supported by the ATGW or the neighboring MGW, and information regarding a codec supported by a neighboring Circuit Switched (CS) network; and a determinator that determines whether transmission of an SDP offer for codec re-negotiation from the ATCF to a communication terminal is allowed using the information regarding a codec acquired in the SDP analyzer and the information retrieved from the data storage, wherein in the case in which the codec contained in the SDP offer received by the receiver in the session setup is not the same as the codec supported by the ATGW or the neighboring MGW, if the codec is deleted from the SDP offer and the SDP offer is transmitted, the determinator determines that the speech data is anchored in the ATGW, and wherein if the codec is not deleted from the SDP offer and the SDP offer is transmitted, the determinator determines that the speech data is not anchored in the ATGW.

2. The network node according to claim 1, wherein the determination as to whether transmission of the SDP offer for codec re-negotiation from the ATCF to the communication terminal is allowed is made by the determinator determining whether speech data is anchored in the ATGW or determining whether the SDP offer for codec re-negotiation is transmitted to the communication terminal.

3. The network node according to claim 1, wherein if the codec contained in the SDP offer received by the receiver when the communication terminal performs handover is not the same as the codec supported by the ATGW, the determinator determines that the SDP offer for codec re-negotiation is transmitted to the communication terminal.

4. A network node having Access Transfer Control Function (ATCF) for use in enhanced Single Radio Voice Call Continuity (eSRVCC), comprising:

a receiver that receives Session Description Protocol (SDP) offer or SDP answer included in IP Multimedia Subsystem (IMS) signaling;

an SDP analyzer that acquires information regarding a codec contained in the SDP offer or the SDP answer;

a data storage that holds at least one of information regarding a codec supported by Access Transfer Gateway (ATGW) or a neighboring Media Gateway (MGW), information regarding transcoding supported by the ATGW or the neighboring MGW, and information regarding a codec supported by a neighboring Circuit Switched (CS) network; and a determinator that determines whether transmission of an SDP offer for codec re-negotiation from the ATCF to a communication terminal is allowed using the information regarding codec acquired in the SDP analyzer and the information retrieved from the data storage, wherein when the codec contained in the SDP offer received by the receiver when the communication terminal performs handover is not the same as or not compatible with a codec supported by the neighboring CS network and if transcoding is not performed on the codec contained in the SDP offer or the SDP answer in the ATGW or the neighboring MGW, the determinator determines that the SDP offer for codec re-negotiation is to be transmitted to the communication terminal.

5. A signaling processing method for use in a network node having, Access Transfer Control Function (ATCF) for use in enhanced Single Radio Voice Call Continuity (eS-RVCC), the method comprising:

receiving SDP (Session Description Protocol) offer or SDP answer included in IP Multimedia Subsystem (IMS) signaling;

acquiring information regarding a codec contained in the SDP offer or the SDP answer;

acquiring at least one of information regarding codec supported by Access Transfer Gateway (ATGW) or a neighboring Media Gateway (MGW), information regarding transcoding supported by the ATGW or the neighboring MGW, and information regarding a codec supported by a neighboring Circuit Switched (CS) network; and determining whether transmission of the SDP offer for codec re-negotiation from the ATCF to a communication terminal is allowed using the acquired information, wherein in the case in which the codec contained in the SDP offer received in the session setup is not the same as the codec supported by the ATGW or the neighboring MGW, if the codec is deleted from the SDP offer and the codec is transmitted, it is determined that the speech data is anchored in the ATGW, and wherein if the codec is not deleted from the SDP offer and the SDP offer is transmitted, it is determined that the speech data is not anchored in the ATGW.

6. The signaling processing method according to claim 5, wherein the determination as to whether transmission of the SDP offer for codec re-negotiation from the ATCF to the communication terminal is allowed is made by determining whether speech data is anchored in the ATGW or determining whether the SDP offer for codec re-negotiation is transmitted to the communication terminal.

7. The signaling processing method according to claim 5, wherein if the codec contained in the SDP offer received when the communication terminal performs handover is not the same as the codec supported by the ATGW, it is determined that the SDP offer for codec re-negotiation is transmitted to the communication terminal.

8. A signaling processing method for use in a network node having Access Transfer Control Function (ATCF) for use in enhanced Single Radio Voice Call Continuity (eS-RVCC), the method comprising:

receiving SDP (Session Description Protocol) offer or SDP answer included in IP Multimedia Subsystem (IMS) signaling;

acquiring information regarding a codec contained in the SDP offer or the SDP answer;

acquiring at least one of information regarding codec supported by Access Transfer Gateway (ATGW) or a neighboring Media Gateway (MGW), information regarding transcoding supported by the ATGW or the neighboring MGW, and information regarding a codec supported by a neighboring Circuit Switched (CS) network; and determining whether transmission of the SDP offer for codec re-negotiation from the ATCF to a communication terminal is allowed using the acquired information, wherein when the codec contained in the SDP offer received when the communication terminal performs handover is not the same as or not compatible with a codec supported by the neighboring CS network and if transcoding is not performed on the codec contained in the SDP offer or the SDP answer in the ATGW or the neighboring MGW, it is determined that the SDP offer for codec re-negotiation is to be transmitted to the communication terminal.

\* \* \* \* \*